United States Patent [19]
Wagner et al.

[11] Patent Number: 5,591,096
[45] Date of Patent: Jan. 7, 1997

[54] EMERGENCY RUNNING DRIVING ARRANGEMENT FOR A CHANGE-SPEED GEARBOX AUTOMATIC SELECTOR APPLIANCE

[75] Inventors: Gerhard Wagner, Remseck; Ludger Kortenjann, Fellbach; Bernd Bertsche, Tuttlingen, all of Germany

[73] Assignee: Mercedes-Benz AG, Germany

[21] Appl. No.: 528,883

[22] Filed: Sep. 15, 1995

[30] Foreign Application Priority Data

Sep. 15, 1994 [DE] Germany ............... 44 32 851.6

[51] Int. Cl.⁶ ..................................... F16H 3/44
[52] U.S. Cl. .................. 475/119; 475/116; 477/906
[58] Field of Search ..................... 475/116, 119, 475/120; 477/906

[56] References Cited

U.S. PATENT DOCUMENTS

| | | | |
|---|---|---|---|
| 4,006,652 | 2/1977 | Murakami | 475/120 X |
| 4,981,052 | 1/1991 | Gierer . | |
| 5,115,696 | 5/1992 | Takada et al. | 475/116 |
| 5,222,581 | 6/1993 | Paulsen | 475/116 X |
| 5,277,671 | 1/1994 | Paulsen | 475/116 |
| 5,334,114 | 8/1994 | Ando et al. | 475/119 |
| 5,342,253 | 8/1994 | Mizobe et al. | 475/120 X |
| 5,375,483 | 12/1994 | Kim et al. | 475/120 X |
| 5,409,427 | 4/1995 | Mori et al. | 475/120 |
| 5,521,818 | 5/1996 | Palansky et al. | 477/906 X |

FOREIGN PATENT DOCUMENTS

| | | |
|---|---|---|
| 2260172 | 4/1993 | United Kingdom . |
| WO95/02135 | 1/1995 | WIPO . |

*Primary Examiner*—Charles A. Marmor
*Assistant Examiner*—Peter Kwon
*Attorney, Agent, or Firm*—Evenson, McKeown, Edwards & Lenahan, P.L.L.C.

[57] ABSTRACT

An arrangement drives an automatic selector appliance of a change-speed gearbox of a motor vehicle into a position for emergency running in the event of a failure of an electronic control unit. A specified forward gear is selected, after the vehicle has come to rest, by manually moving a range selector valve into a P position and back into a D position.

8 Claims, 3 Drawing Sheets

| | Block1 | | Block2 | | Block3 | | | Frei-läufe | |
|---|---|---|---|---|---|---|---|---|---|
| | K1 | B1 | K2 | K3 l | K3 r | B2 | BR | F1 | F2 |
| I | | ● | | ● | | ● | | ● | ● |
| II | ● | | | ● | | ● | | | ● |
| III | ● | | ● | | | ● | | | |
| IV | ● | | ● | | ● | | | | |
| V | | ● | ● | | ● | | | | |
| R | | ● | | ● | | | ● | ● | ● |
| N | ○ | ● | | ● | | | | | |

EMERGENCY RUNNING DRIVING ARRANGEMENT FOR A CHANGE-SPEED GEARBOX AUTOMATIC SELECTOR APPLIANCE

BACKGROUND AND SUMMARY OF THE INVENTION

The present invention relates to an arrangement in for driving an automatic selector appliance of a motor vehicle change-speed gearbox into a position for a forward gear specified for emergency running in the event of failure of an electronic control unit, and, more particularly to an arrangement comprising a selector actuator operable to select forward gear by the engagement of at least two frictional selector connections and being driven by pressure medium, a pressure pump for generating a system pressure of a two-positional directional selector valve for subjecting the selector actuator to the system pressure, a main-pressure control valve for regulating the system pressure or is derived from such a regulated pressure.

In a known arrangement described in WO 88/01029 A1, the emergency control valve is held in its shut-off position, in which a selection of the third gear specified for emergency running is not possible in the case of a fault, by its self-retention function, which is maintained by the system pressure. In order to permit the emergency running control valve to be switched over in the event of a fault, the driving engine (and with it the pressure pump generating the system pressure) must be switched off with the vehicle at rest so that the emergency running control valve is moved into its emergency running position by its spring reset. When the driving engine is restarted with the emergency running control valve in its emergency running position, i.e. in the N position of the range selector valve, the system pressure which is now again available is fed to the control part of a selector valve so that the selector valve, which is in its basic position, is switched over. As a result, a connected selector actuator for the third gear is subjected to system pressure. When the range selector valve is subsequently moved into the D position, the other selector actuators of the third gear, of which one is directly connected to the range selector valve and two are connected to it via associated selector valves, are subjected to system pressure. Switching off the driving engine, after the electronic control unit has already failed, can lead to dangerous driving conditions, particularly because this action has also switched off the auxiliary energy for steering forces, braking forces and the like.

An arrangement for driving an automatic selector appliance of a change-speed gearbox with four forward gears is shown in U.S. Pat. No. 5,191,815. In the event of a failure or of a fault in the electronic control unit, the third gear is immediately selected and the working pressure for the selector actuators is set immediately to the highest value.

DE 41 32 873 C2 describes an automatic selector appliance for a change-speed gearbox of the epicyclic type which operates with a frictional selector (clutch or brake), which can be engaged by a selector actuator of the axial piston type, between two gear elements which can rotate relative to one another, with a seleeter valve for subjecting the selector actuator to pressure and with an electromagnetic switch-over control valve which can be controlled by an electronic control unit and is used for switching over a selector valve. In this known selector appliance arrangement, both the selector valve and the switch-over control valve can be respectively switched over between a rest position, which can be selected by spring force, and a working position. The selector actuator is connected to a pressure-relieved null connection in the rest position of the selector valve and, in the working position is connected to a system pressure conduit carrying a control system pressure. A selector valve control connection used for switching over into the rest position is connected to a pressure-relieved null connection in the rest position of the switch-over control valve and, in the working position of the switch-over control valve, is connected to a control pressure supply conduit leading to a control pressure.

The selector actuator which has just been actuated must remain subjected to working pressure in this known selector appliance even in the case of a failure of the electrical voltage supply. When the engine is switched off, the selector appliance should take up such a position that the selector actuators remain unpressurized when the engine is restarted. For this purpose, the known arrangement is such that the selector valve can be additionally actuated into its rest position by the control pressure of the switch-over control valve and can be additionally actuated into its working position by a control pressure which depends on the pressure of the selector actuator and has appropriate control connections.

In addition, the known arrangement is such that the switch-over control valve is only brought into its working position in phases but is, on the other hand, in its rest position in the non-transient condition of the selectors, i.e. when these selectors are fully engaged or fully disengaged. Moreover, a control valve has a valve connection for a control pressure conduit leading to the control connection of the selector valve for driving it into the working position, a valve connection for a control pressure conduit leading to the control connection of the selector valve for driving it into the rest position, a valve connection for a control pressure conduit leading to the switch-over control valve and a valve connection for pressure relief.

The control valve of this known arrangement is switchable over between a rest position, on one hand, in which the valve connection for the control pressure conduit for actuating the selector valve, in the rest position of the latter, is connected to the valve connection for pressure relief. In contrast, the valve connection for the control pressure conduit to actuate the selector valve, in the working position of the latter, is connected to the valve connection for the control pressure conduit leading to the selector valve, and on the other hand, a working position in which the valve connection for the control pressure conduit for actuating the selector valve into the rest position is connected to the valve connection for the control pressure conduit leading to the selector valve. The valve connection for the control pressure conduit for actuating the selector valve is connected, in the working position of the latter, to the valve connection for pressure relief. Furthermore, this known arrangement is such that the control valve is switched over as a function of the condition of the selector so that the valve connection of the control valve for the control pressure conduit leading to the switch-over control valve is positively connected in one non-transient condition of the selector to the valve connection for the control pressure conduit for switching the selector valve over into its position which brings the selector into the other nontransient condition.

Because of this configuration, the switch-over control valve is always located in its rest position in the non-transient condition of the selector in the case of the known selector appliance. Consequently, an electronics or voltage failure does not change anything in the selection condition.

In the disengaged condition of the selector, the selector valve is held in its rest position by spring force and, in the engaged condition, is held in its working position by the self-retention effect of the relevant control pressure, which depends on the pressure of the selector actuator. The control valve is always precontrolled, as a function of the respective instantaneous non-transient condition of the selector, so as to adopt that position in which, on excitation of the switch-over control valve, the selector valve is switched over into the position for the respectively other selection condition, i.e. the one which is not non-transient at that instant. When the engine is switched off, the pressure supply is also switched off so that the selector valve and the control valve are moved into their respective rest positions by spring force. As a result, the selector actuators unpressurized when the engine is restarted.

In order to control the control valve as a function of the non-transient condition of the selector, the known selector appliance actuates the control valve into each of its two positions by a positional control pressure and has appropriate control connections. A positional control valve has a valve connection for a control pressure conduit leading to the control connection of the control valve for moving the latter into the rest position, a valve connection for a control pressure conduit leading to the control connection of the control valve for moving the latter into the working position, a valve connection for a control pressure feed conduit carrying a control pressure and a valve connection for pressure relief. The positional control valve is switchable over between a rest position, on one hand, in which the valve connection for the control pressure conduit for actuating the control valve, in the rest position of the latter, is connected to the valve connection for the control pressure feed conduit and the valve connection for the control pressure conduit for actuating the control valve, in the working position of the latter, is connected to the valve connection for pressure relief, and a working position, on the other hand, in which the valve connection for the control pressure conduit for actuating the control valve into its rest position is connected to the valve connection for pressure relief and the valve connection for the control pressure conduit for actuating the control valve into its working position is connected to the valve connection for the control pressure feed conduit.

The known arrangement moves the positional control valve by spring force into its rest position and into its working position by a control pressure which depends on the pressure of the selector actuator. The control valve is additionally actuatable into each of its two positions by a control pressure which depends on the switch-over control valve and has relevant control connections. The control connection of the control valve is connected, for the movement of the latter into the rest position, to the control pressure conduit leading to the selector valve for the movement of this latter valve into the working position by the control pressure which depends on the switch-over control valve and for the control connection of the control valve, for the movement of the latter into the working position by the control pressure which depends on the switch-over control valve, to be connected to the control pressure conduit leading to the selector valve for the movement of this latter valve into the rest position by the control pressure which depends on the switch-over control valve.

The *Automobile Technical Journal* 85 (1983), 6, pp. 401–405 discloses another arrangement for the control of an automatic selector appliance of a gear shifter of a motor vehicle which is already different from the arrangement of the present invention in that a special emergency running control valve is not included. If with this known arrangement a security function is called for, as for example is the case if going beyond the maximum engine speed or an interruption of electrical transmissions occurs, the transmission then switches into idle, the spring-loaded magnetic valves move into switching portion "3". With this known arrangement during idle position, the position "neutral" and "rearward" may be chosen hydraulically by means of the drive lever.

DE 24 38 249 discloses an electronic control apparatus especially for a gear shifting arrangement in automatic transmissions of motor vehicles with a combustion engine which provides for a security device to prevent the overstepping of the allowable maximum speed. Contrary to the arrangement in accordance with the invention for an automatic selector appliance, the here known electronic drive device does not include a special emergency running control valve. However, this electronic drive device does include an arrangement for switching off the other part of the drive device if the maximum allowable speed of the engine is exceeded, whereby the highest gear is engaged following the switching off of the drive device. This feature is to prevent any danger during operation of the motor vehicle in case of a parting of a cable or during shut-down of the entire electronic drive device. With this type of break-down it should thus at least be possible to drive to the closest service station using one of the gears. The driver should not be in a position to limit the running steps to a much lower speed or to have to engage the rearward speed during an excessively high motor vehicle speed. It is especially to be avoided during malfunctioning of the electronic drive device or of the speed control sensor that the engine oversteps if too low a gear is engaged, that is to say the maximum allowable speed of the engine was exceeded.

U.S. Pat. No. 4,976,171 discloses an arrangement different in kind for the control of an automatic selector appliance of a motor vehicle drive transmission, which allows for the operation of a shift lever from a p-range into a drive-range only if the service brake was first used.

An object of the present invention is to avoid the occurrence of unsafe driving conditions when selecting the forward gear specified for emergency running in an arrangement for driving a selector appliance into a position for emergency running.

The foregoing object has been achieved in an advantageous manner in accordance with the present invention, by providing that the valve inlet of the range selector valve is configured to be put under system pressure and is connected to the valve outlet of the emergency running control valve for indirectly subjecting the selector actuator to pressure. The range selector valve has a valve outlet connected to the control pressure connection of the emergency running control valve and valve connections corresponding with the valve outlet. One of the valve connections is arranged to operate as a pressure-relieved null connection and the other of the valve connections is arranged to be continuously put under a system pressure. The valve outlet is exclusively connected, in the P position, to a corresponding one of the valve connections, which initiates, on a basis of pressure level thereof, switch-over of the emergency running control valve into the emergency running position and is connected to the other corresponding one of the valve connection in other positions of the range selector valve. The self-retention function of the emergency running control valve is usable for the emergency running position, and the control pressure for the maintenance of the self-retention function is derivable from the pressure level at the valve outlet of the emergency running control valve for indirectly subjecting the selector actuator to pressure.

In the arrangement according to the present invention, it is unnecessary to switch off the driving engine for the purpose of switching over the emergency running control valve into its emergency running position. On the contrary, the vehicle can be brought to rest with the engine running in order to put the range selector valve into the parking position P. The emergency running control valve is switched over into its emergency running position by this manual selection of the P position of the range selector valve. This, of course, is only possible when the vehicle is at rest because of the positive connection with the parking brake. Because the at-rest condition of the vehicle is imposed for this purpose, no unsafe driving conditions are possible during the subsequent selection of the forward gear specified for emergency running by actuation of the range selector valve into its D position.

Another advantageous feature of the present invention is a simplification of the valve construction of the emergency running control valve. In particular, the self-retention function of the emergency running control valve is provided by a 3/2-way shuttle valve in which one valve connections of two associated valve connections configured to be shut off alternatively relative to the first-mentioned valve connection is connected to the valve outlet of the range selector valve configured for connection to the control pressure connection of the emergency running control valve. The other valve connection of the two valve connections of the shuttle valve is configured to be shut off and connected to the valve outlet of the emergency running control valve for indirectly subjecting the selector actuator to pressure. A third valve connection of the shuttle valve is configured to remain open permanently and is connected to the control pressure connection of the emergency running control valve.

An advantageous simplification of the control measures for the emergency running is accomplished by providing that at least one of the selector actuators of the forward gear usable for emergency running is subjected to system pressure independently of the range selector valve and the emergency running control valve and is alone subjectable to system pressure because, in the condition where no current or pressure is supplied, the basic setting of the respectively associated selector valve and control valve when the selector appliance is brought into the emergency running position.

A special emergency running control valve can be advantageously omitted because its function is transferred to another control valve of the selector appliance. Specifically, a gear-retention control valve is the emergency running control valve in which two valve outlets are respectively connected to one valve connection of the selector valve of a selector actuator of the forward gear specified for emergency running. In two end positions thereof, the gear-retention control valve connects a valve inlet thereof, which is under system pressure, to a valve outlet thereof associated with the respective end position and connects another valve outlet to a pressure-relieved null connection. One valve connection of the selector valve is connected to one valve outlet of the gear-retention control valve and is connected in its basic position to a selector actuator which is subjected to system pressure both in the forward gear specified for emergency running and in a further forward gear. The other valve connection of the selector valve is connected to a valve outlet of the gear-retention control valve and is connected in its basic position to a selector actuator which is subjected to system pressure in the forward gear specified for emergency running but is pressure-relieved in the further forward gear.

The selector actuator, which is pressure relieved in the further forward gear, is connected to the valve connection of a second selector valve which is connected, in the basic position of the second selector valve, to a further valve connection of the second selector valve. The further valve connection is subjected to a system pressure via a valve connection of a connected second gear-retention control valve in a basic position thereof, and the connection between the selector actuator which is pressure-relieved in the further forward gear and the respectively affected valve connection of the two selector valves occurs via a 3/2-way shuttle valve, with the permanently open valve connection being connected to the selector actuator.

An advantageous pressure supply is provided to the range selector valve when the emergency running control valve is switched over in the system pressure of the valve connection of the range selector valve, is arranged to be continuously put under a system pressure and corresponds with the valve outlet of the range selector valve connected to the control pressure connection of the emergency running control valve. The system pressure of the valve connection is lowered relative to the system pressure regulated by the main pressure control valve.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figures 1, 2:
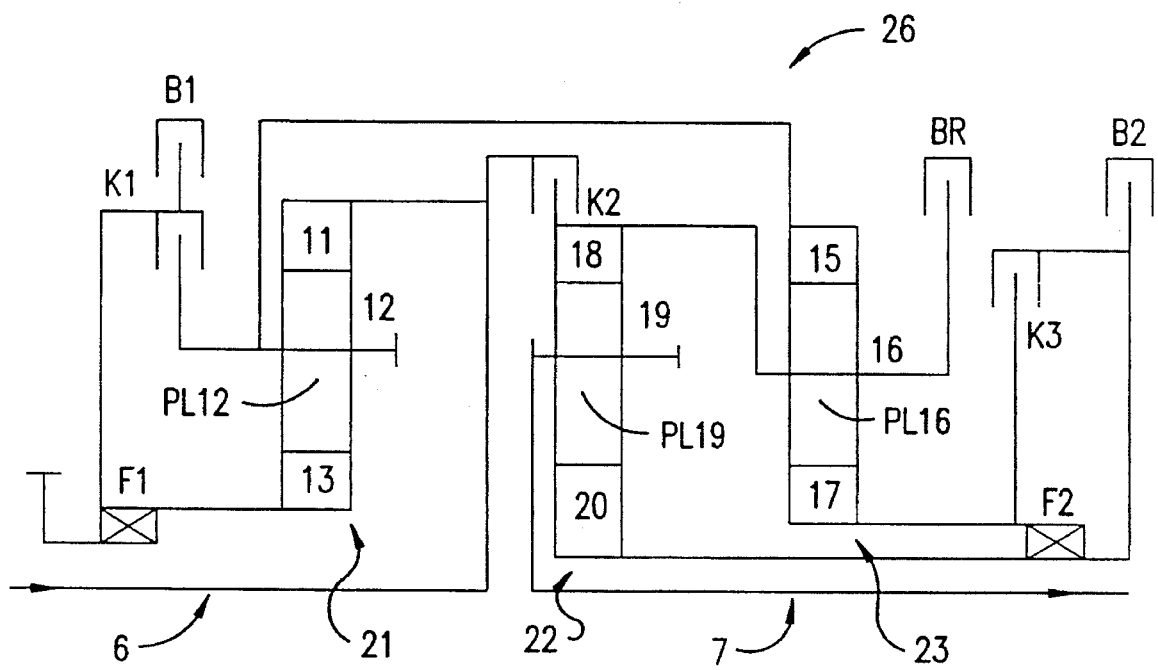
FIG. 1 is a schematic gearbox diagram of a change-speed gearbox of the epicyclic type with the frictional selector connections (clutch or brake) necessary for the gear changes.
FIG. 2 is a table of the selector connections effective in the individual gears.

Referring to FIGS. 1 and 2, a change-speed gearbox 26 consists of three epicyclic partial gearboxes 21, 22 and 23 with outer central wheels 11, 18 and 15, respectively, inner central wheels 13, 20 and 17, respectively, planet carriers 12, 19 and 16, respectively, and planet wheels PL12, PL19 and PL16, respectively, rotatably supported on the respective planet carriers 12, 19 and 16 and engaging with the inner and outer central wheels.

An input shaft 6 driven by a driving engine via a hydrodynamic torque converter is directly connected to the outer central wheel 11 of the input-end partial gear 21 and is connected, via a frictional clutch K2, which can be engaged and disengaged, to the outer central wheel 18 of the output-end partial gear 22. The inner central wheel 13 of the input-end partial gear 21 can be brought to rest relative to a non-rotating casing by a frictional selector brake B1, which can be engaged and disengaged, and can be fixed so that it cannot rotate, relative to the housing, in the direction of rotation opposite to the input shaft 6 by a positive overrunning clutch F1. It can also be coupled to the planet carrier 12 of the input-end partial gear 21 by a frictional clutch K1 which can be engaged and disengaged.

The planet carrier 12 is in turn permanently connected to the outer central wheel 15 of the third partial gear 23. The outer central wheel 18 of the output-end partial gear 22 is rotationally connected to the planet carrier 16 of the third partial gear 23. This planet carrier 16 can be brought to rest relative to the caging by a frictional selector brake BR which can be engaged and disengaged. The inner central wheel 20 of the output-end partial gear 22 is connected to the inner central wheel 17 of the third partial gear 23 both by a positive overrunning clutch F2 and by a frictional clutch K3, which can be engaged and disengaged. The overrunning clutch F2 prevents any rotational motion of the central wheel 17 relative to the central wheel 20 which is directed against the direction of rotation of the input shaft 6. Finally, the inner central wheel 20 of the output-end partial gear 22 can also be brought to rest relative to the casing by a frictional selector brake B2 which can be engaged and disengaged.

Figure 3:
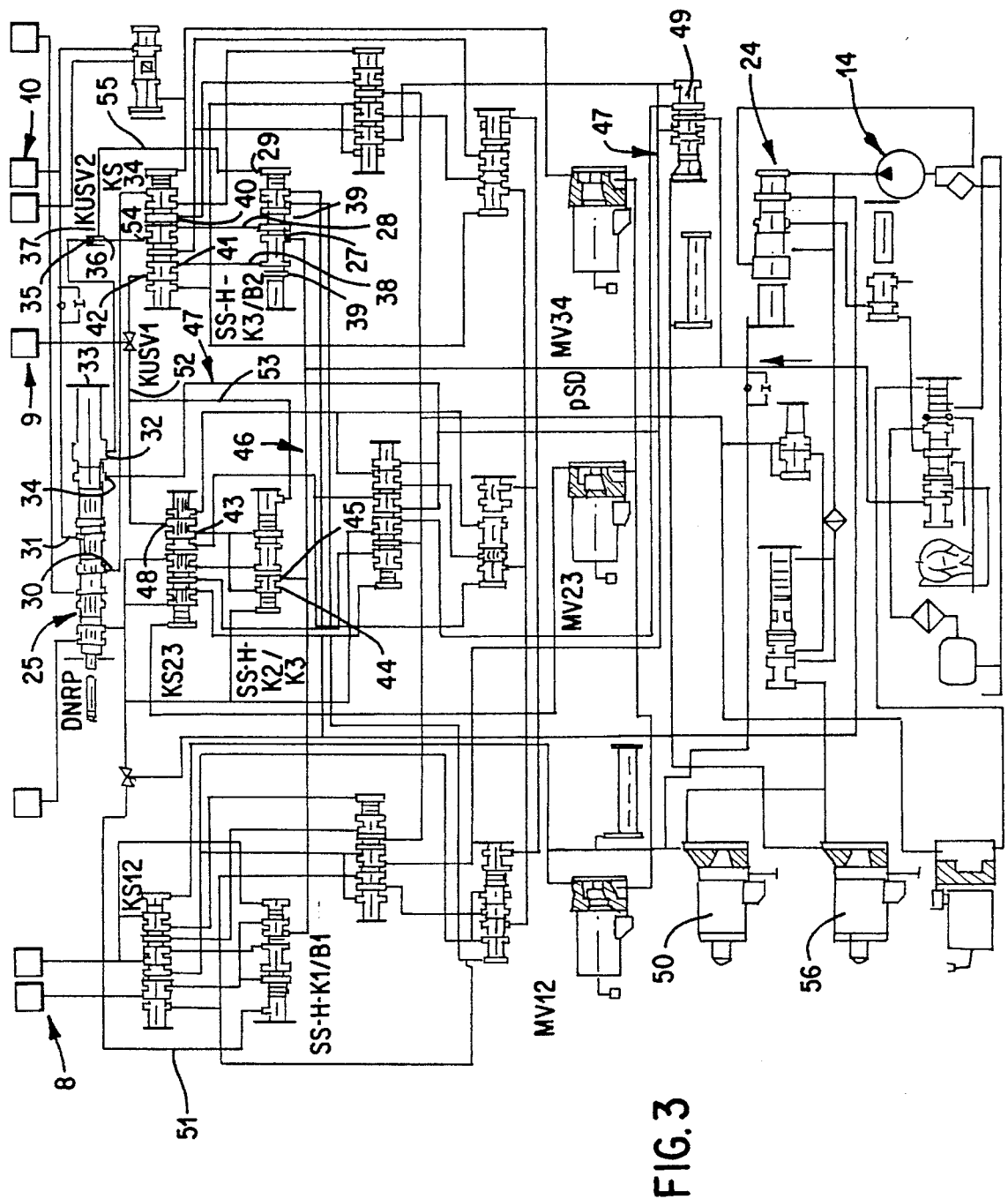
FIG. 3 is a schematic block circuit diagram for an arrangement in accordance with the present invention for controlling a selector appliance for the change-speed gearbox of FIGS. 1 and 2.
Figure 4:
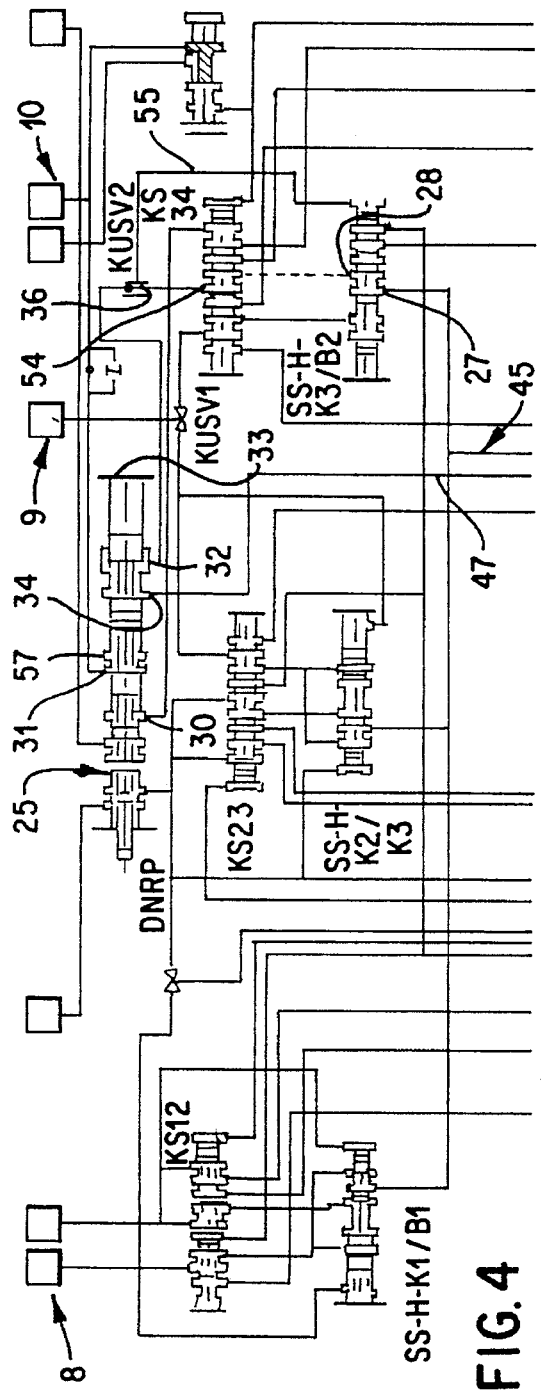
FIG. 4 is a part of the arrangement of FIG. 3 showing a certain phase for selecting the second gear specified for emergency running.
Figure 5:
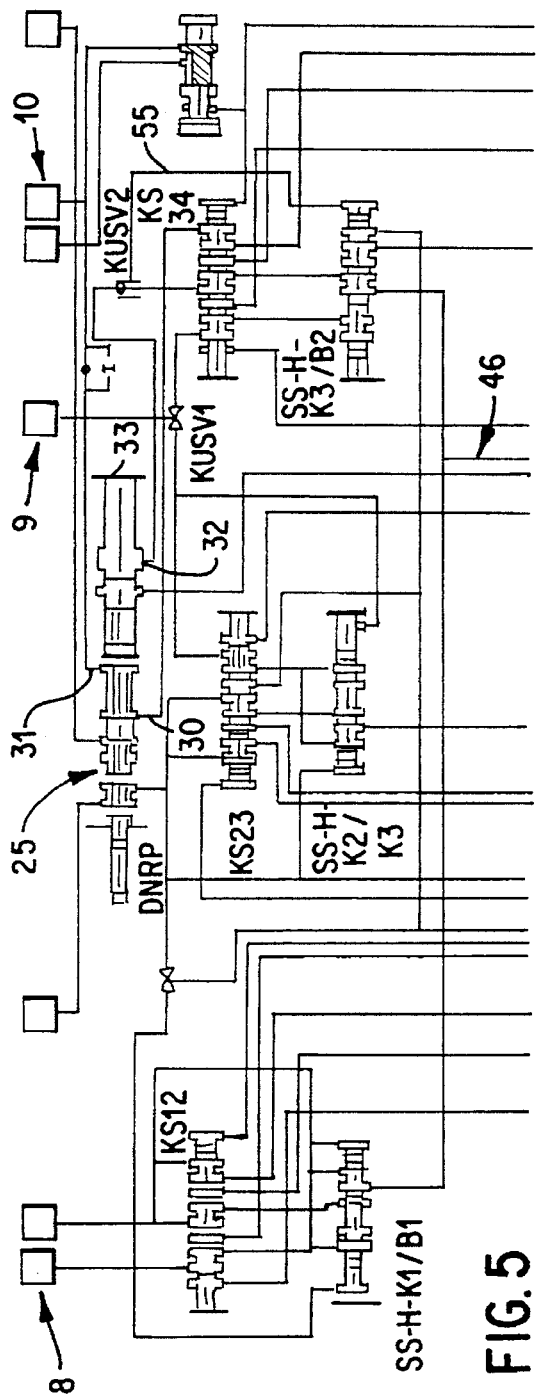
FIG. 5 is the arrangement part in a non-transient condition, following after the phase represented in FIG. 4, of the second gear specified for emergency running.

Each of the selector connections B1, B2, BR, K1, K2 and K3 engaged in the gears I to V and R is immediately apparent from the table of FIG. 2, which also shows two of the conditions, depending on the instantaneous vehicle speed, of the selector appliance for the position N of a manually actuated range selector valve 25 shown in FIGS. 3 to 5. Each represents a condition of the gearbox in which no torque is transmitted. Whereas, from this, the selector brake B1 and the selector clutch K3 are engaged in the position N of the range selector valve 25 at a vehicle speed which is less than a lower limiting value, the selector clutches K1 and K3 are engaged in the position N of the range selector valve 25 at vehicle speeds which are above the lower limiting value.

In accordance with the table of FIG. 2, the forward gear II is selected by engaging the friction clutches K1 and K3 and also the selector brake B2.

Referring to FIG. 3, the selector clutch K1 is engaged by a selector actuator 8 operated by pressure medium. The selector clutch K3 is engaged by a selector actuator 9 operated by pressure medium, and the selector brake B2 is engaged by a selector actuator 10 operated by pressure medium. The selector actuators used can, in the usual manner, be of the axial piston type.

The selector actuator 8 is connected, via a two-position directional selector valve KS12 and a two-position directional gear retention control valve SS-H-K1/B1, to a system pressure conduit 46 in which a system pressure pA generated by a pressure pump 14, which is driven by the driving engine of the motor vehicle, is regulated by a connected main-pressure control valve 24 as a function of an electromagnetically actuated pressure control valve 50, the latter being controlled by a conventional type of electronic control unit.

If no current is supplied to the electromagnetic pressure control valve 50, the main-pressure control valve 24 sets the system pressure pA to a maximum value. The selector valve KS12 is held in its illustrated basic position by a spring reset and is driven into its other end position by the control pressure of an electromagnetic control valve MV12. The latter is in turn activated by the electronic control unit and sets the control pressure to zero when no current is supplied. The gear retention control valve SS-H-K1/B1 is held in its illustrated basic position by a spring reset and, if the selector actuator 8 is subjected to pressure, by the self-retention function of a connected control pressure conduit 51.

The selector actuator 9 is connected to the permanently open valve connection of a 3/2-way shuttle valve KUSV1. The latter's alternately closable valve connections are respectively connected to two-position directional selector valves KS23 and KS34. The selector valve KS23 is held in its illustrated basic position by a spring reset and is driven into its other end position by the control pressure of an electromagnetically actuated control valve MV23. The latter is in turn actuated by the electronic control unit and sets the control pressure to zero when no current is supplied. In its basic position, the selector valve KS23 connects its two valve connections 43 and 48, of which the former is connected to a valve outlet 44 of a two-positional directional gear-retention control valve SS-H-K2/K3 and the latter is connected to the shuttle valve KUSV1.

The gear-retention control valve SS-H-K2/K3 is held in its illustrated basic position by a spring reset means, if the conduit 52 leading from the selector valve KS23 to the shuttle valve KUSV1 is subjected to system pressure, by the self-retention function of a connected control pressure conduit 53. In its basic position, the gear-retention control valve SS-H-K2/K3 connects its valve inlet 45, which is connected to the system pressure conduit 46, to its valve outlet 44.

The selector valve KS34, which is provided with, among other things, valve connections 40, 41, 42 and 54, is held in its basic position shown by a spring reset and is driven into its other end position by the control pressure of an electromagnetically actuated control valve MV34. The latter is in turn activated by the control unit and sets the control pressure to zero when no current is supplied. In the basic position of the control valve KS34, the two valve connections 41 and 42 are connected together. The valve connection 41 of the selector valve KS34 is connected to a valve outlet 38 of a two-position directional gear retention control valve SS-H-K2/B2. The valve connection 42 of the selector valve KS34 is connected to the shuttle valve KUSV1.

In the basic position of the selector valve KS34, its valve connections 40 and 54 are also connected to one another. The valve connection 40 of the selector valve KS34 is connected to a further valve outlet 28 of the gear retention control valve SS-H-K3/B2. The gear retention control valve SS-H-K3/B2 has, in addition, a valve inlet 27 connected to the system pressure conduit 46, a control pressure connection 29 connected to a control pressure conduit 55 and two pressure-relieved null connections 39. The gear-retention control valve SS-H-K3/B2 is held by a spring reset in its illustrated basic position, in which the valve inlet 27 is connected to the valve outlet 38, the null connection 39 adjacent to the valve outlet 38 is shut off, the valve outlet 28 is connected to the adjacent null connection 39 and the control pressure connection 29 is pressure-relieved.

The control pressure conduit 55 of the gear retention control valve SS-H-K3/B2 leads to the permanently open valve connection 37 of a second 3/2-way shuttle valve KUSV2. One closable valve connection 35 of the shuttle valve KUSV2 is connected to a valve connection 32 of the range selector valve 25. The other closable valve connection 36 of the second shuttle valve KUSV2 is connected both to the valve connection 54 of the selector valve KS34 and to a further valve connection 30 of the range selector valve 25.

The range selector valve 25 has, furthermore, a valve connection 31 connected to the selector actuator 10 and two valve connections 33, 34 which correspond with the valve connection 32. Whereas a pressure-relieved null connection is used for the corresponding valve connection 33, a system pressure conduit 47 is connected to the other corresponding valve connection 34. This system pressure conduit 47 is connected in turn to the system pressure conduit 46 by a pressure control valve 49. The pressure control valve 49 sets the system pressure pSD in the system pressure conduit 47 to a level which is lower than the system pressure pA as a function of an electromagnetically actuated pressure control valve 56. The latter is activated by the electronic control unit and causes the setting of a maximum value of the system pressure pSD when current is not supplied to the pressure control valve 49.

The range selector valve 25 can, in the usual manner, be moved manually into a position D, which is shown in FIG. 3 and in which all the forward gears I to V can be selected under the control of the electronic control unit. The range selector valve 25 can, furthermore, be manually moved in known manner into the position N, into a position R for the selection of the reverse gear and, with the gearbox in the condition where no torque is being transmitted, into a position P for the engagement of a positive parking lock.

In FIG. 3, the selector appliance is, generally speaking, shown in a condition of readiness for the second gear, which is specified for emergency running and in which the associated selector clutches K1 and K2 have already been engaged, but with the associated selector brake B2, however, still disengaged. This readiness position is determined by the fact that, on one hand, all the electromagnetically influenced valves MV12, MV23, MV34, 50 and 56 have no current supplied to them so that the selector valves KS12, KS23 and KS34 and also the connected gear-retention control valves SS-H-K1/B1; SS-H-K2/K3 and SS-H-K3/B2 are in their respective basic positions and that, on the other hand, the range selector valve 25 is in the D position.

In the readiness condition, the selector actuator 8 of the selector clutch K1 is connected to the system pressure conduit 46 via its selector valve KS12 and the connected gear-retention control valve SS-H-K1/B1. That is, the selector actuator 8 is subjected to the system pressure pA which is set to its maximum value. The selector actuator 9 of the selector clutch K3 is connected both via the selector valve KS23 with the connected gear-retention control valve SS-H-K2/K3 and via the selector valve KS34 with the connected gear-retention control valve SS-H-K3/B2 to the system pressure conduit 46. That is, it is likewise subjected to the system pressure pA which is set to its maximum value. The selector actuator 10 of the selector brake B2, on the other hand, is pressure-relieved via the valve connections 28 and 39 of the gear-retention control valve SS-H-K3/B2 and, specifically, via the valve connections 30, 31 of the range selector valve 25 and the valve connections 40 and 54 of the selector valve KS34.

In order to be able to select the second gear for emergency running from the readiness condition of FIG. 3 in the case of a fault or failure in the electronic control unit, the vehicle must first be brought to rest so that the range selector valve 25 can be moved into the P position shown in FIG. 4. In the P position, the selector actuator 8 of the selector clutch K1 continues to be subjected, as above described, to system pressure pA via the selector valve KS12, and the selector actuator 9 of the selector clutch K3 continues to be subjected to system pressure pA via the selector valve KS23, whereas the selector actuator 10 of the selector brake B2 continues to be pressure-relieved, now via a pressure-relieved null connection 57 of the range selector valve, which null connection 57 is connected to the valve connection 31 of the range selector valve 25.

In the P position, the valve connection 32 on the range selector valve 25 is now shut off from the null connection 33 and is connected to the valve connection 34 so that the control pressure conduit 55 is connected to the system pressure conduit 47. Consequently, the gear-retention control valve SS-H-K3/B2 is switched over by the system pressure pSD into its respectively other end position (i.e. the so-called emergency running position) and is held there by the self-retention function of the control pressure conduit 55. This results from the valve inlet 27, which is under the higher system pressure pA, of the gear-retention control valve SS-H-K3/B2 being now connected, via its valve outlet 28, to the valve inlet 36 of the shuttle valve KUSV2 so that the latter connects inlet the control pressure conduit 55 to the valve inlet 27 of the gear-retention control valve SS-H-K3/B2 and, therefore to the system pressure conduit 46. The latter is also connected in this way to the valve inlet 30 of the range selector valve 25 by the valve connection 54 of the selector valve K34.

In this manner, the system pressure pA necessary for a subsequent selection of the forward gear II is available at the correct valve inlet, i.e. at the valve inlet 30 corresponding with the valve inlet 31. The shuttle valve KUSV1 and the connected selector valve KS23 are necessary for this phase of the readiness condition because the selector actuator 9 of the selector clutch K3 would otherwise be pressure-relieved via the valve outlet 38 of the gear-retention control valve SS-H-K3/B2, which valve outlet 38 is now connected to the adjacent null connection 39.

During an actuation of the range selector valve 25 following a phase, as described above, of the readiness condition in which the vehicle is still at rest from the P position into the D position as seen in FIG. 5, nothing changes with respect to the non-transient engaged condition of the selector clutches K1 and K3 while the selector brake B2 is now also engaged. As a result, the forward gear II is selected because, in the D position, the valve connections 30 and 31 of the range selector valve 25 are connected together so that the system pressure conduit 46 is connected to the selector actuator 10 via the gear-retention control valve SS-H-K3/B2, the selector valve KS34 and the range selector valve 25.

The shuttle valve KUSV2 is shut off, in this case, by the system pressure pA from the valve connection 32 of the range selector valve 25, and the valve connection 32 is connected in the D position to the pressure-relieved null connection 33.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for driving an automatic selector appliance of a motor vehicle change-speed gearbox into a position for a forward gear specified for emergency running in the event of failure of an electronic control unit, comprising at least one selector actuator operable to select the forward gear by engagement of at least two frictional selector connections and being pressure medium driven, a pressure pump driven by an engine of a motor vehicle for generating a system pressure, a respective two-positional directional selector valve for subjecting the associated selector actuator to the system pressure, a main-pressure control valve for one of directly and indirectly regulating the system pressure, the selector valves are configured to be switchable over by an associated electromagnetically actuated 3/2-way control valve controllable by the electronic control unit, in association with an associated spring reset, a range selector valve configured to be manually moved into a position D for a selection program, including all forward gears, into a position N for a change-speed gearbox gear condition in which engine torque is not transmitted and into a position P for the engagement of a positive parking brake in a gearbox condition in which torque is not transmitted, at least one of the selector actuators for selecting the forward gear specified for emergency running is subjectable to a system pressure under control of an emergency running control valve having a valve inlet selectively subjectable to system pressure, a valve outlet for directly subjecting the selector actuator to pressure, a control pressure connection and a self-retention function for one of two positions thereof, said emergency running control valve being configured to be switchable over by a control pressure force, derived from the system pressure, in association with a spring reset between an emergency running position, in which the valve inlet and the valve outlet are connectable together and a shut-off position in which the valve inlet and the valve outlet are shut off from one another, the range selector valve having a valve inlet arranged to be put under system pressure and a valve outlet which is operatively connected to at least one of the selector actuators of the forward gear specified for emergency running and, in the D position, is also connected to the valve inlet, whereby, in a condition where electric current and pressure are not provided for the selector valves, respective basic settings of the electromagnetically actuated control valves and of the emergency running control valve and an association thereof with the range selector valve and with the selector actuators of the forward gear specified for emergency running are such that when the motor vehicle is at rest with the engine running, without a supply of current to the control valves and without torque transmission, the emergency running control valve is in an emergency running position in which movement of the range selector valve into the D position, positions the selector appliance for emergency running, in which all the relevant selector actuators are subjected to the system pressure, wherein the valve inlet of the range selector valve is configured to be put under system pressure and is operatively connected to the valve outlet of the emergency running control valve for indirectly subjecting the selector actuator to pressure, the range selector valve has a valve outlet connected to the control pressure connection of the emergency running control valve and valve connections corresponding with the valve outlet, with one of the valve connections being operable as a pressure-relieved null connection and the other of the valve connections arranged to be continuously put under a system pressure, the valve outlet being exclusively connected, in the P position, to a corresponding one of the valve connections, which initiates, on a basis of pressure level thereof, switchover of the emergency running control valve into the emergency running position and being connected to the other corresponding one of the valve connections in other positions of the range selector valve, and the self-retention function of the emergency running control valve is operable for the emergency running position, and the control pressure for the maintenance of the self-retention function is derivable from the pressure level at the valve outlet of the emergency running control valve for indirectly subjecting the selector actuator to pressure.

2. The arrangement according to claim 1, wherein the self-retention function of the emergency running control valve is provided by a 3/2-way shuttle valve configured and arranged such that one valve connection of two associated valve connections operable to be shut off alternatively relative to the first-mentioned valve connections is connected to the valve outlet of the range selector valve operatively connected to the control pressure connection of the emergency running control valve, the other valve connection of the two valve connections of the shuttle valve is operable to be shut off and connected to the valve outlet of the emergency running control valve for indirectly subjecting the selector actuator to pressure, and a third valve connection of the shuttle valve is permanently open and connected to the control pressure connection of the emergency running control valve.

3. The arrangement according to claim 1, wherein at least one of the selector actuators of the forward gear usable for emergency running is arranged to be subjected to system pressure independently of the range selector valve and the emergency running control valve and is alone subjectable to system pressure due to in a condition where no current or pressure is supplied thereto, the basic setting of the respectively associated selector valve and control valve in the emergency running position of the selector appliance.

4. The arrangement according to claim 3, wherein a 3/2-way shuttle valve provides the self-retention function of the emergency running control valve the 3/2-way shuttle valve being configured such that one valve connection of two associated valve connections operable to be shut off alternatively relative to the first-mentioned valve connections is connected to the valve outlet of the range selector valve configured for connection to the control pressure connection of the emergency running control valve, the other valve connection of the two valve connections of the shuttle valve is operable to be shut off and connected to the valve outlet of the emergency running control valve for indirectly subjecting the selector actuator to pressure, and a third valve connection of the shuttle valve, is permanently open and is operatively connected to the control pressure connection of the emergency running control valve.

5. The arrangement according to claim 1, wherein a gear-retention control valve is the emergency running control valve in which two valve outlets are respectively connected to one valve connection of the selector valve of a selector actuator of the forward gear specified for emergency running, and, in two end positions thereof, the gear-retention control valve operatively connects a valve inlet thereof under system pressure, to a valve outlet thereof associated with the respective end position and connects another valve outlet to a pressure-relieved null connection, and one valve connection of the selector valve is operatively connected to one valve outlet of the gear-retention control valve and is operatively connected in its basic position to a selector actuator which is subjected to system pressure both in the forward gear specified for emergency running and in a further forward gear, whereas the other valve connection of the selector valve is operatively connected to a valve outlet of the gear-retention control valve and is operatively connected in its basic position to a selector actuator which is subjected to system pressure in the forward gear specified for emergency running but is pressure-relieved in the further forward gear, and the selector actuator, which is pressure relieved in the further forward gear, is operatively connected to the valve connection of a second selector valve which is operatively connected, in the basic position of the second selector valve, to a further valve connection of the second selector valve subjected to a system pressure via a valve connection of a connected second gear-retention control valve in a basic position thereof, and a 3/2-way shuttle valve operatively connects the selector actuator which is pressure-relieved in the further forward gear and the respectively affected valve connection of the two selector valves with the permanently open valve connection being operatively connected to the selector actuator.

6. The arrangement according to claim 5, wherein a 3/2-way shuttle valve provides the self-retention function of the emergency running control valve the 3/2-way shuttle valve being configured such that one valve connection of two associated valve connections operable to be shut off alternatively relative to the first-mentioned valve connections is connected to the valve outlet of the range selector valve configured for connection to the control pressure connection of the emergency running control valve, the other valve connection of the two valve connections of the shuttle valve is operable to be shut off and connected to the valve outlet of the emergency running control valve for indirectly subjecting the selector actuator to pressure, and a third valve connection of the shuttle valve, is permanently open and is operatively connected to the control pressure connection of the emergency running control valve.

7. The arrangement according to claim 6, wherein at least one of the selector actuators of the forward gear usable for emergency running is subjected to system pressure independently of the range selector valve and the emergency running control valve and is alone subjectable to system pressure due to, in the condition where no current or pressure is supplied, the basic setting of the respectively associated selector valve and control valve when the selector appliance is brought into the emergency running position.

8. The arrangement according to claim 1, wherein the system pressure of the valve connection of the range selector valve is arranged to be continuously put under a system pressure and corresponds with the valve outlet of the range selector valve operatively connected to the control pressure connection of the emergency running control valve, and means is provided for lowering the system pressure of the valve connection relative to the system pressure regulated by the main pressure control valve.

* * * * *